(No Model.) 9 Sheets—Sheet 1.
L. MUTHER, R. G. WOODWARD & E. C. HOLLAND.
SEWING MACHINE.
No. 583,415. Patented May 25, 1897.
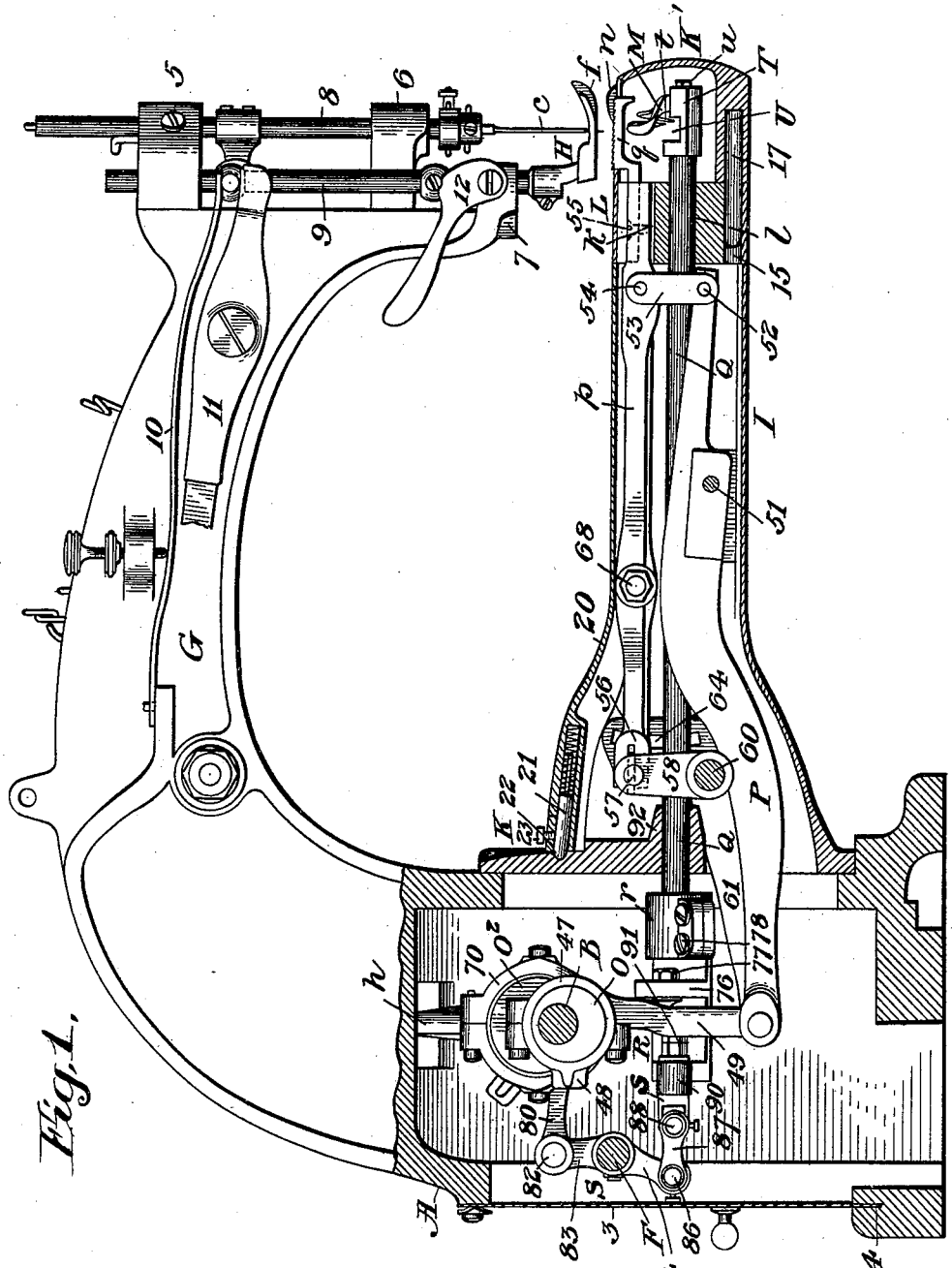

(No Model.) 9 Sheets—Sheet 2.
L. MUTHER, R. G. WOODWARD & E. C. HOLLAND.
SEWING MACHINE.
No. 583,415. Patented May 25, 1897.
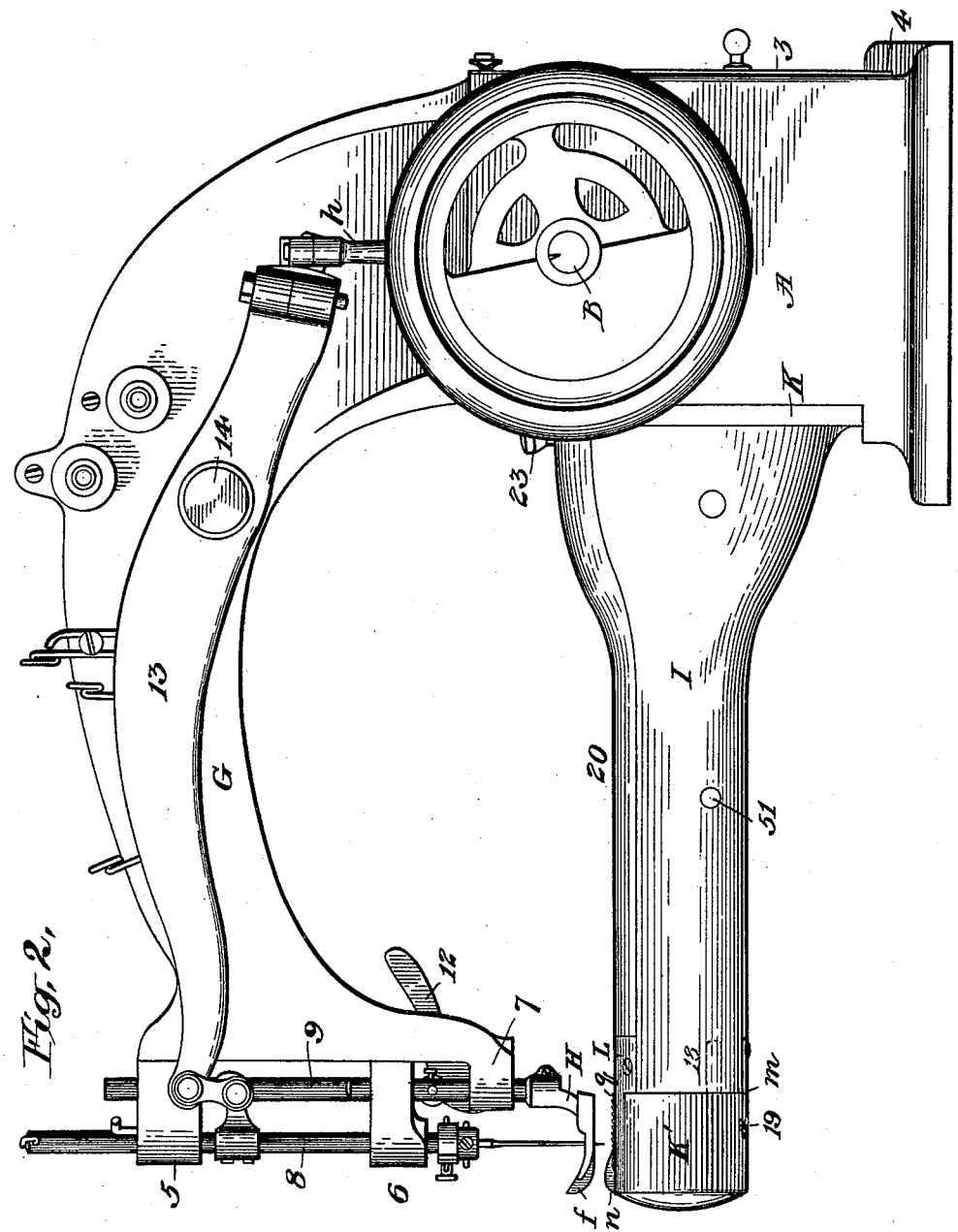

(No Model.) 9 Sheets—Sheet 3.
L. MUTHER, R. G. WOODWARD & E. C. HOLLAND.
SEWING MACHINE.
No. 583,415. Patented May 25, 1897.
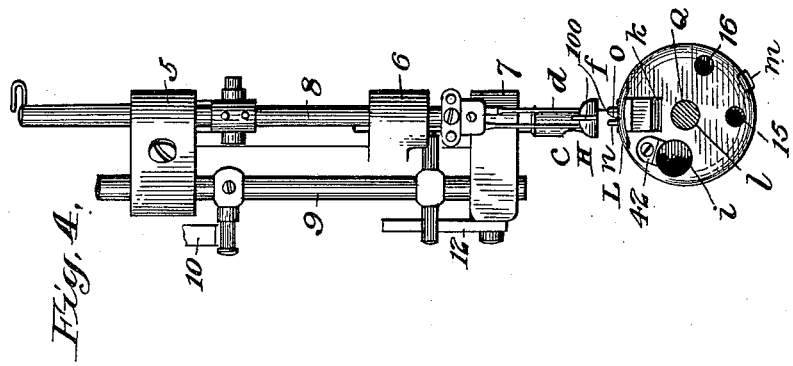

(No Model.) 9 Sheets—Sheet 4.
L. MUTHER, R. G. WOODWARD & E. C. HOLLAND.
SEWING MACHINE.
No. 583,415. Patented May 25, 1897.
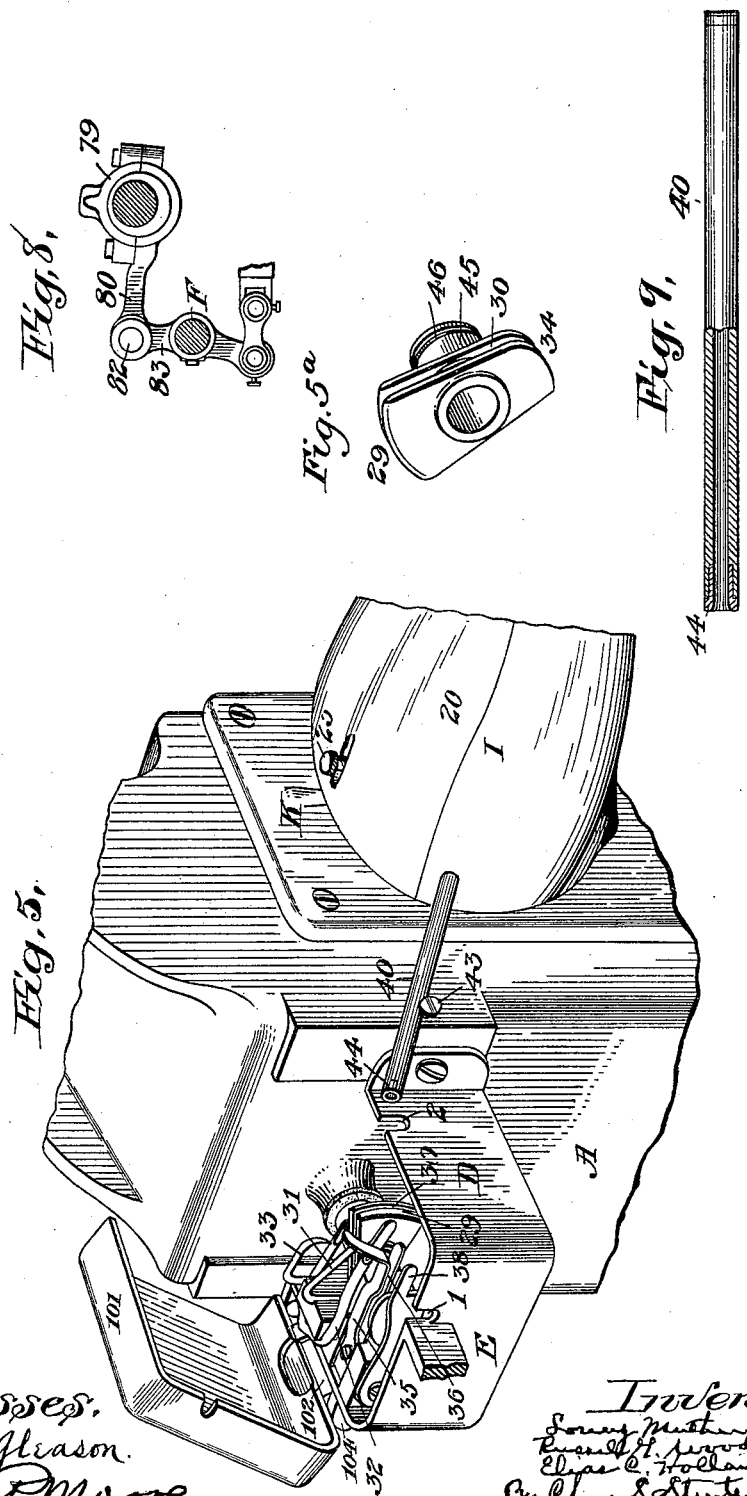

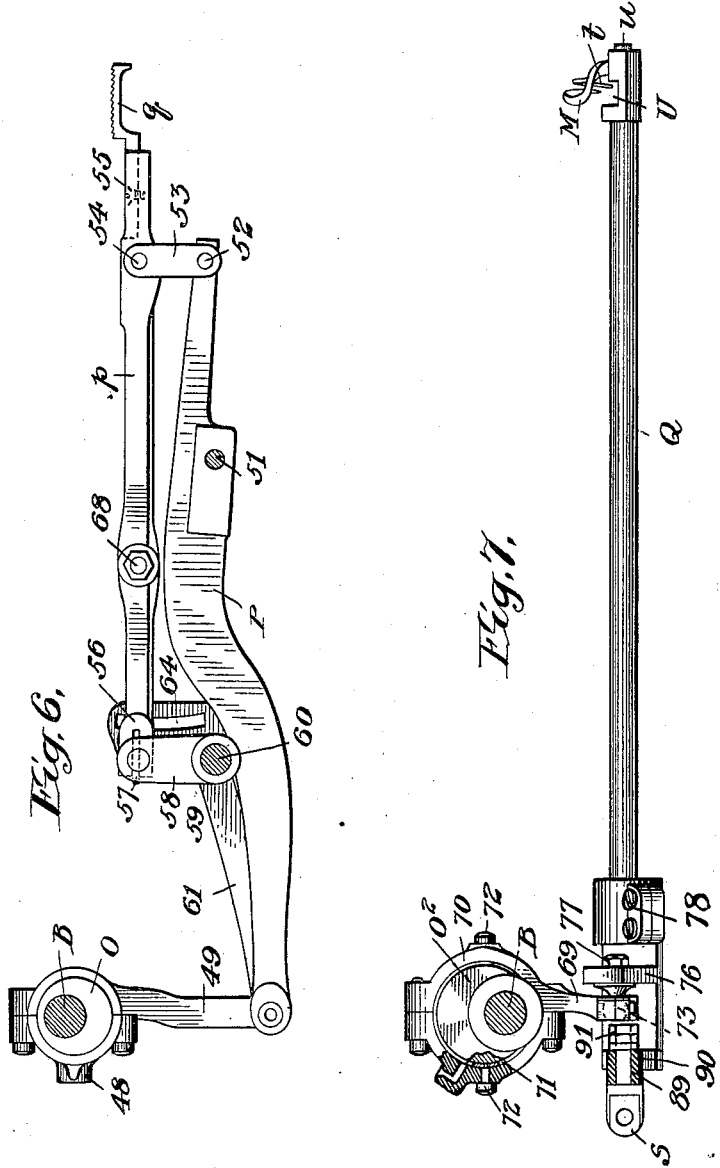

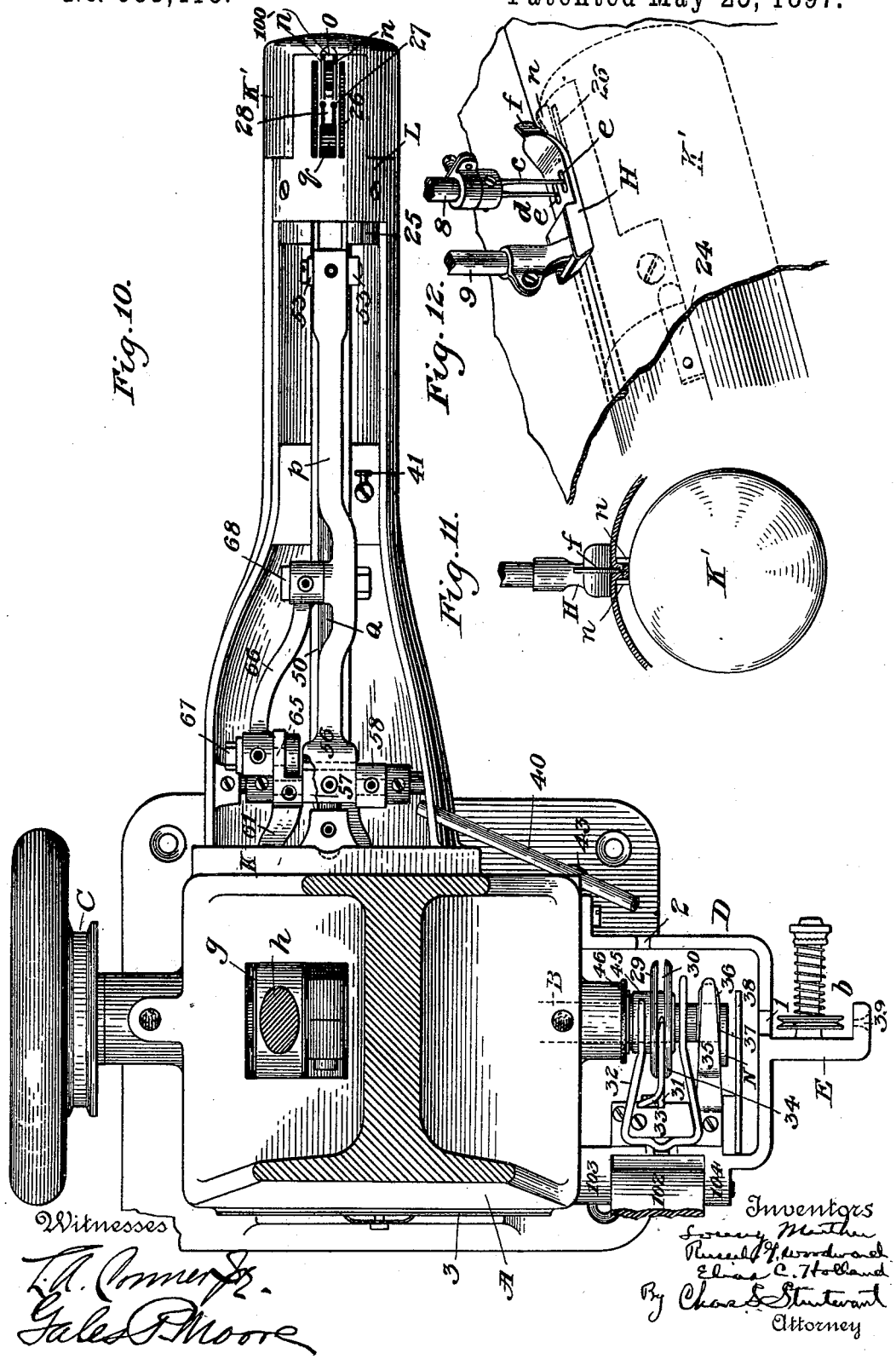

(No Model.) 9 Sheets—Sheet 7.
L. MUTHER, R. G. WOODWARD & E. C. HOLLAND.
SEWING MACHINE.
No. 583,415. Patented May 25, 1897.
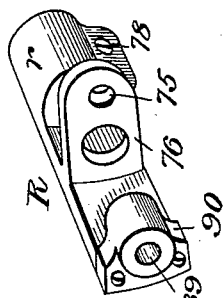
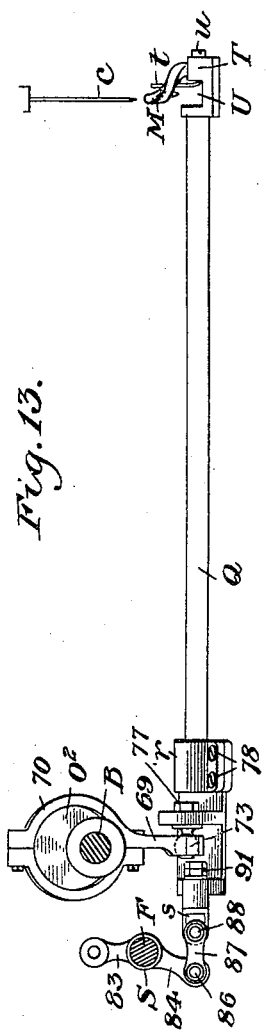
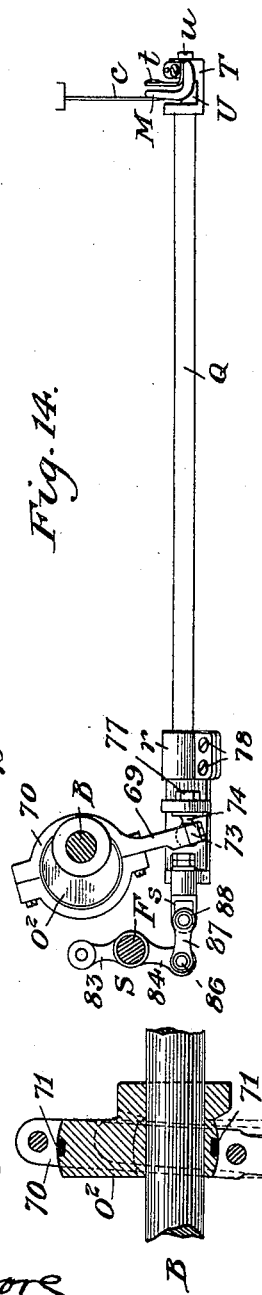
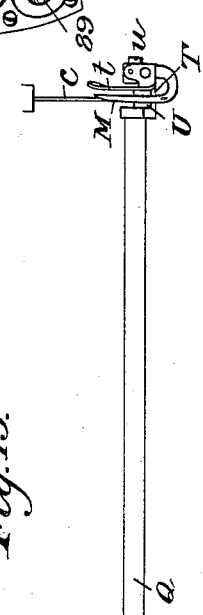
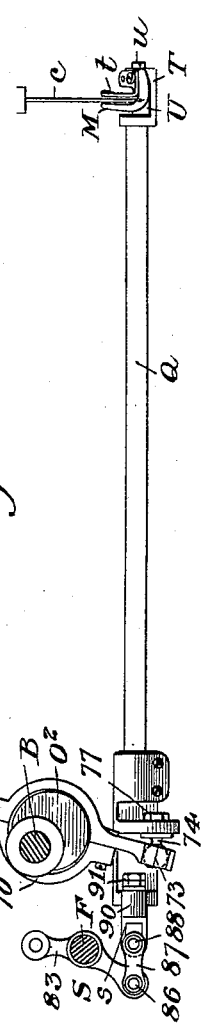

(No Model.) 9 Sheets—Sheet 8.
L. MUTHER, R. G. WOODWARD & E. C. HOLLAND.
SEWING MACHINE.
No. 583,415. Patented May 25, 1897.
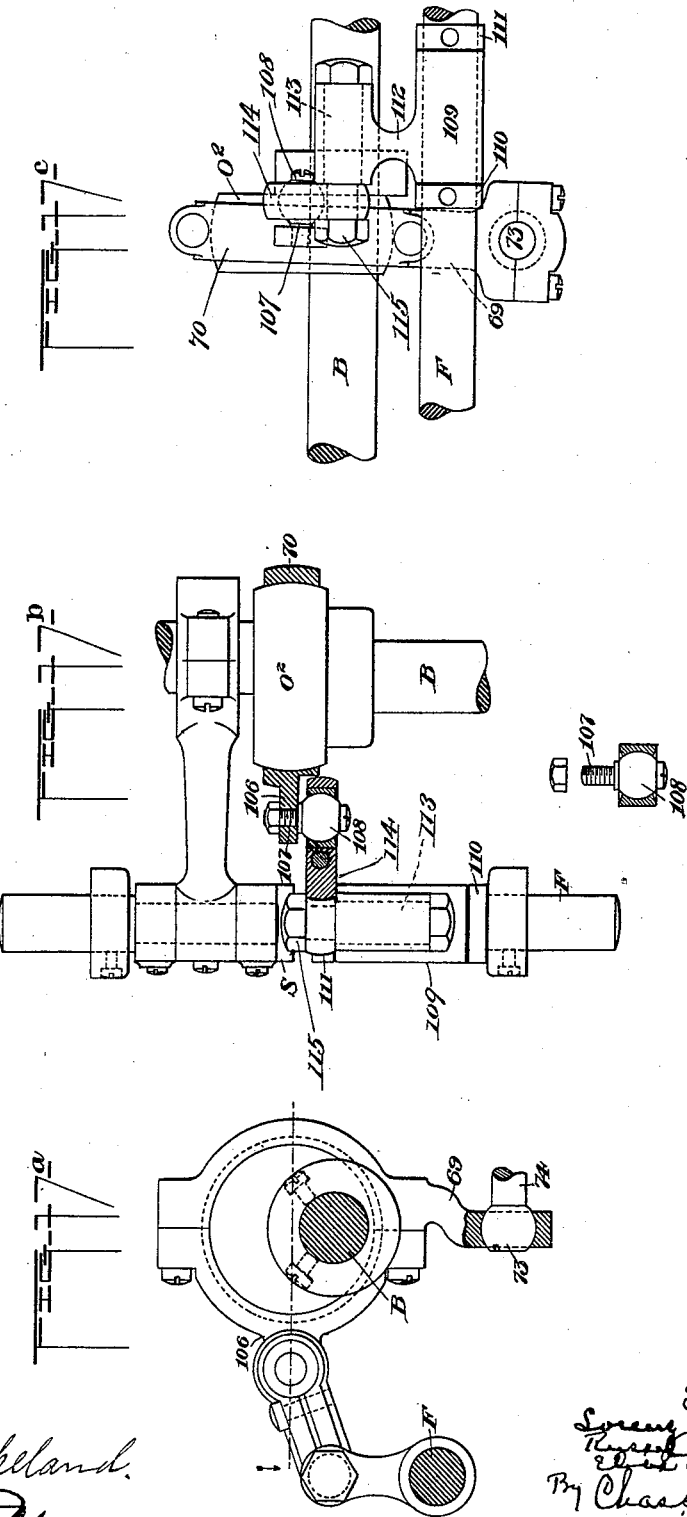
Witnesses
Frank Copeland
Gales F. Moore
Inventors
Lorenz Muther
Russell G. Woodward
Elliot C. Holland
By Chas. S. Sturtevant
Attorney (No Model.) 9 Sheets—Sheet 9.
L. MUTHER, R. G. WOODWARD & E. C. HOLLAND.
SEWING MACHINE.
No. 583,415. Patented May 25, 1897.
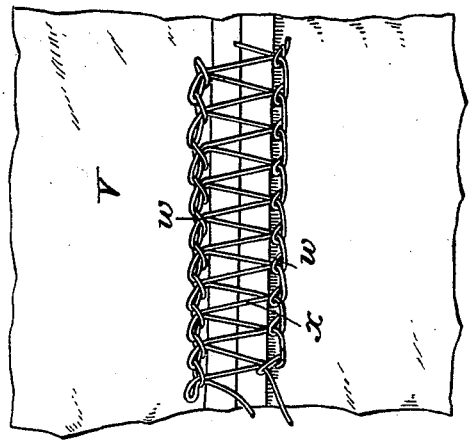
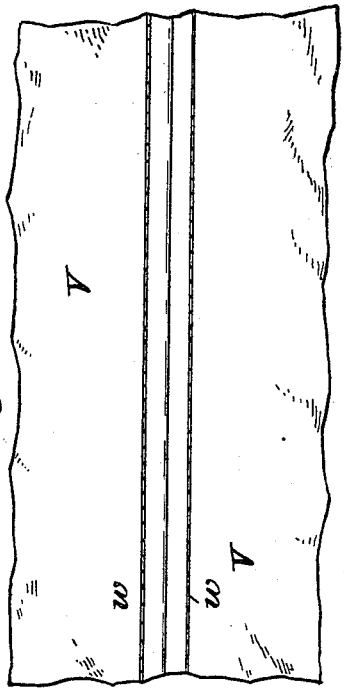
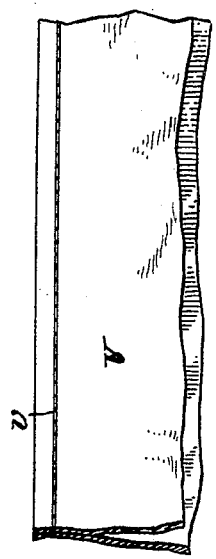
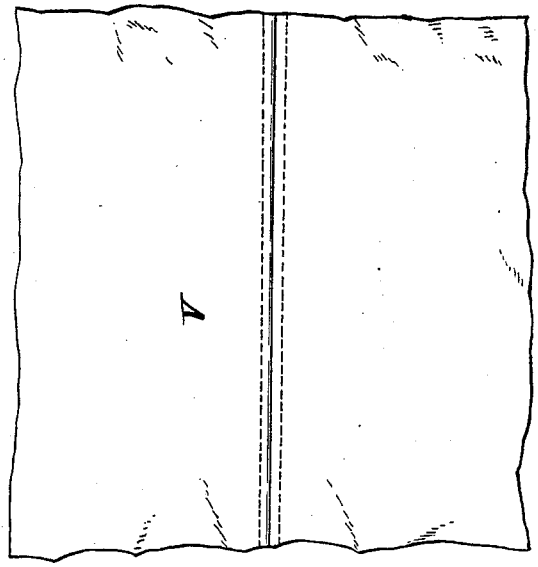
Witnesses
Inventors
Lorenz Muther
Russell G. Woodward
Elias C. Holland
By Chas. S. Sturtevant
Attorney

UNITED STATES PATENT OFFICE.

LORENZ MUTHER, OF OAK PARK, RUSSEL G. WOODWARD, OF WAUKEGAN, AND ELIAS CALVIN HOLLAND, OF AUSTIN, ILLINOIS, ASSIGNORS TO THE UNION SPECIAL SEWING MACHINE COMPANY, OF CHICAGO, ILLINOIS.

SEWING-MACHINE.

SPECIFICATION forming part of Letters Patent No. 583,415, dated May 25, 1897.

Application filed February 5, 1895. Serial No. 537,342. (No model.)

*To all whom it may concern:*

Be it known that we, LORENZ MUTHER, residing at Oak Park, Cook county, RUSSEL G. WOODWARD, residing at Waukegan, Lake county, and ELIAS CALVIN HOLLAND, residing at Austin, Cook county, State of Illinois, citizens of the United States, have invented certain new and useful Improvements in Sewing-Machines, of which the following is a description, reference being had to the accompanying drawings, and to the letters and figures of reference marked thereon.

Our invention relates to an improvement in sewing-machines, and particularly to that class known as "horn-machines," in which the work is placed over a horn or cylindrical bedplate, the feed being arranged and working longitudinally of the arm.

The particular machine as herein illustrated is designed for sewing together the edges of tubular fabrics, such as the sleeves of shirts and the like, or to cover the seams thereof.

A further object is to so form the parts that they may be arranged within a very small space and yet be perfectly efficient in operation and capable of working at a very high rate of speed.

The machine herein shown is provided with means whereby it is especially adapted for the covering of seams, and the parts enabling this function to be performed are claimed, as well as those features which adapt the machine to other uses.

In the covering of seams on knit goods—such as the sleeves of shirts, legs or seats of drawers, &c.—the fabrics are first placed one on top of the other, edge to edge, and a line of straight stitching sewed back of the edges, thus uniting the fabrics, the surplus material outside the line of stitching being simultaneously trimmed off, which operation is performed on any of the usual and well-known seaming-machines. The two pieces of fabric are then spread out so that they lie in the same plane, leaving a ridge, formed by the two raw edges of the fabric, projecting downward from the body thereof. The sleeve or other tubular part containing the seam to be covered is then placed over the horn of the machine and the stitching mechanism set in motion, this mechanism being arranged to lay a thread back and forth across the raw edge of the fabric, thus covering the ridge and flattening it down, the completed article having a strong and flat seam without the objectionable ridge so common on knit goods.

The stitch-forming mechanism herein shown comprises two vertically-moving needles with a single looper coöperating therewith, the fabric being fed in with the ridge downward between guides on the work-plate, the needles depositing a row of loops on either side of the dividing line or fold of the fabrics, while the under-thread carrier or looper carries a thread back and forth between the loops on the under surface of the fabric across the ridge, thus covering said ridge and flattening it down.

As to its main features of construction, the machine is useful for any purpose for which a horn-machine is adapted, and of course may be used for ordinary plain sewing. Furthermore, it is particularly well adapted for use in the manufacture of clothing, overalls, shirts, &c., or for making lap-seams on tubes or uniting fabrics by a tape or stay, or for covering seams with a stay, and we do not desire to be limited in any respect regarding the purposes for which the machine may be applied.

The invention consists in the matters hereinafter described, and referred to in the appended claims.

The invention is illustrated in the accompanying drawings, in which—

Figure 1 is a side elevation of the machine with parts of the rear casing or standard and of the cylindrical bed-plate removed. Fig. 2 is a view of the machine, taken on the opposite side from Fig. 1. Fig. 3 is a rear view, the pivoted door of the casing being swung to one side. Fig. 4 is a front view of the head of the machine. Fig. 5 is a detached view of the take-up mechanism and the box containing the same. Fig. 5$^a$ is a detail perspective view of the take-up cam. Fig. 6 is a detail view of the feed mechanism detached. Fig. 7 is a similar view of part of the looper mechanism detached. Fig. 8 is a detail view of another part of the mechanism for actuating the looper-shaft. Fig. 9 is a detail view, partly in section, of the tube for guiding the thread from the take-up mechanism to the cylinder. Fig. 10 is a horizontal section of the machine with the gooseneck and parts supported by it removed. Fig. 11 is a detailed end view showing the fabric in position. Fig. 12 is a detail perspective view of the end of the machine, showing the presser-foot, needle-bar, and the fabric in position. Figs. 13, 14, 15, and 16 are detail views showing the operation of the looper-actuating mechanism. Fig. 17 is an enlarged sectional view of the looper-shaft-rocking mechanism. Fig. 17$^a$ is a side view, partly in section, showing other means of transmitting motion from the eccentric on the main shaft to the looper-shaft for giving to the latter its oscillatory movement. Fig. 17$^b$ is a plan view, partly in section, of the mechanism shown in Fig. 17$^a$. Fig. 17$^c$ is a rear view of the same. Figs. 18 and 19 are detail views of the fabric at different stages before the seam is covered. Figs. 20, 21, and 22 are top, bottom, and sectional views, respectively, of the fabric having a covered seam; and Fig. 23 is a perspective view of the crank having a sleeve on the end which holds one end of the looper-shaft and upon which are the lugs to which are attached the mechanisms for giving reciprocatory and oscillatory movement to the looper-shaft.

In the drawings, A represents the rear casing or standard of the machine, through which passes transversely the main shaft B, having its bearings in journals in the sides of the standard, one end of said shaft outside the standard being provided with a belt-wheel C, while upon the other end of the shaft outside the standard the take-up mechanism is placed, this take-up mechanism being included within a supplemental casing D, secured to the main standard and having suitable notches 1 2 for the ingress and egress of the under or looper thread, and provided also with an integral lug E, to which is secured the ordinary tension $b$.

The standard A is made hollow, and upon the main shaft within the same is a series of eccentrics for giving the necessary movements to the feeding and looper mechanisms, a second shaft F being provided within the standard at the rear to act as a rocker for the connections actuated from the main shaft, which give the forward and backward reciprocation to the looper-shaft. This standard is open at the rear and is provided with a transversely-swinging door 3, pivoted to the top of the standard by means of the screw 3$^a$, and being prevented from rattling by the spring-washer 3$^b$, arranged between the head of the screw and the door 3. This door is rounded off on one edge, as shown in Fig. 3, and fits a transverse slot 4 in the lower part of the standard.

Rising from the top of the standard A and extending toward the front of the machine at right angles to the main shaft is the gooseneck G, having a head on its outer end with lugs 5 6 7, having openings for the passage of the needle and presser bars 8 9. The needle-bar 8 is shown in this form of machine as provided with two needles $c\ d$, arranged so that a line joining them will be parallel to the axis of the main shaft or at right angles to the line of feed, while the presser-foot H is attached in the usual way to the presser-bar 9 and has openings $e$ for the passage of the needles. It is provided on its under surface with a keel or fin $f$, arranged in front of the needle-openings and extending a slight distance in advance of the toe of the presser-foot.

The gooseneck G is provided with the usual thread eyelets and tensions on one side, as shown in Fig. 2, and on the other side (see Fig. 1) with the spring 10 for normally keeping the presser-foot down. A foot-lever 11 is also pivoted to this side of the gooseneck to allow of the raising of the presser-foot if it be not desired to use the hand-lever 12.

The needle arm or lever 13 is of usual construction, is pivoted on the stud 14, secured to the gooseneck, and reciprocates the needle-bar in the well-known manner. The needle-arm is operated from the main shaft by the eccentric $g$ and connecting-rod $h$, passing up through an opening in the top of the standard and having a ball connection with the end of the needle-arm.

The bed-plate I of the machine is cylindrical in shape and at its rear is cast with an upright rear plate K, adapted to be secured or bolted to the standard A. This casing is enlarged at its rear end to allow of the proper working of certain of the operating parts contained therein, the standard being open at its front adjacent to the end of the cylinder to allow of the passage from the standard into the cylinder of the looper-shaft and the devices for operating the feeding mechanism.

At the forward end the casing I is practically solid, but has an opening $i$ for the passage of the looper-thread, a slot $k$ for the passage of the feed-dog-carrying bar, and an opening $l$ in the center, forming a bearing and guide for the forward end of the looper-shaft, in which bearing said shaft rotates and reciprocates. Two openings 15 16 in the forward end of the casing are for the purpose of receiving and guiding pins 17 18 on a removable end cap K', the latter being kept from accidental displacement by a spring $m$, secured to the under side of the casing and fitting a notch 19 in the end cap. This cap is cylindrical in shape and is open at the top, the sides of the opening being beveled, the projecting end of the throat-plate resting thereon. This cylindrical casing or bed-plate I has a removable top plate 20, with a spring-bolt 21, fitting a slot or hole 22 in the plate K, said bolt being operated by a thumb-piece 23. At the forward end the removable top plate has a spring, tongue, or projection 24 fitting in the groove 25 on the front of the casing and beneath the throat-plate.

The cloth or throat plate L is adapted to be screwed to the casing or bed-plate, but at its forward end projects beyond the same to cover the opening in the end cap, and, as herein shown, is provided with two projections $n\ n$, forming between them a slot or groove $o$, registering with a notch 100 on the end cap, and when it is desired to cover a seam the raw edges of the fabric are placed between these projections $n\ n$, the keel on the presser-foot being arranged in a plane between them and fitting a groove formed by the division-line of the fabrics. If desired, the groove may be formed in the presser-foot and the keel or fin $f$ be on the throat-plate. The cloth-plate L has the usual slots 26 for the passage of the feed-dog and has openings 27 for the passage of two needles, a tongue 28 being formed on said throat-plate, over which the stitches are formed, the loops of said stitches slipping off the tongue as the feed of the goods progresses. In the present machine, in which two needles are used to carry two continuous rows of loops down through the fabric on either side of the line of seam, a single under-thread-carrying looper M is provided, which weaves a thread back and forth across the under surface of the tongue on the throat-plate, this thread being enchained on the under surface of the fabric with the loops of the needle-thread.

In machines having mechanism for making a cross-stitch on the upper surface of the fabric, as well as or instead of on the lower, there is also provided a tongue or tongues over which the stitches are formed, and the tongue or tongues may be arranged on the presser-foot or throat-plate, or, if desired, on both.

The take-up mechanism is arranged on the main shaft and is inclosed within the supplemental casing D heretofore referred to. This supplemental casing D has a cover 101, having a cam-lug 102 pivoted between the lugs 103 and 104, a spring 105, secured to the casing D, acting to hold the cover in its open or closed position. The take-up consists of the rotating cam-disk formed with two cam-surfaces on it, one, 29, acting as a slack-thread take-up for the looper-thread in the rearward movement of the looper and having a groove 30, in which the end of the stationary throw-off arm 31 rests, guides 32 being arranged upon either side of the cam-disk to compel the thread to ride over the edges of the disks. A retaining-arm 33 is also provided to hold the thread on the cam-surface. The second cam-surface or slack-controller 34 on the disk, also grooved for the end of the throw-off arm 31, is made on a radius less than the cam-surface 29, so that the retaining-arm 33 does not act on the thread while the latter is engaged by this surface. An intermittent stop device comprising upper and lower nipper-springs 35 36, the lower of which is closed against the upper by a cam 37, preferably of wood-fiber, which needs no lubricant, and therefore does not soil the thread, this cam being so arranged that in the forward movement of the looper the nipper-springs do not hold the thread, but allow the looper to pull the thread directly through the tension. When the looper is moving backward, however, and there is a slack thread, the nipper-springs close and hold the thread and the take-up acts to take up slack without pulling off thread from the supply.

In the ordinary form of take-up the looper in its forward movement draws the slack, which has been temporarily taken care of by the take-up, and in addition thereto thread sufficient to make another stitch. In the present case, however, the bed-plate is so small that only a limited movement can be given the looper, and, furthermore, as two needles are used additional means must be provided to pull off thread to be used by the looper in passing forward and around the farther needle. To accomplish this result, a cam N or supplemental pull-off is arranged on the main shaft between the nipper-springs and the tension, so timed as to act when the nipper-springs are closed to pull off from the spool, through the tension, a slight amount of thread.

To prevent the thread from being carried around by the supplemental pull-off N, a retaining-guide 38, as shown, is provided, against which the thread is carried by the pull-off.

The under or looper thread is led from the spool through the opening 39 onto the tension, supported by the lug on the casing D. Thence it is led under the shoulder, formed on the retaining-guide 38, between the nipper-springs 35 and 36, through the eyelet of one of the guides 32, across the rotating cam-disk, upon which are the cam-surfaces 29 and 34, thence through the other guide 32, out through the notch 2 in the casing, through the tube 40, through the eyelet 41, secured on the interior of the cylindrical bed-plate, through the opening $i$ at the forward end of said casing I, around the lug 42, secured on the end of the casing, and is then threaded into the looper in the ordinary way. When the looper moves forward and enters the needle-thread loops, the cam-surface 34 controls the slack to prevent the looper from carrying too much loose thread on its forward movement, and at this time the thread is taut across the under side of the guide or lug 42 on the end of the casing. When the looper is in its forward movement and the needles in their raised position, the take-up cam 29 is ready to take up the slack. In the backward movement of the looper the take-up 29 is ready to cast off, having taken up the slack between the forward position of the looper and its passage toward its backward position, the nipper-springs are closed, and the supplemental pull-off or cam N has pulled off a slight amount of thread from the spool and this the looper uses up in passing forward and around the farther needle, but the cam-surface 34 takes up the slack caused by this pulling off of thread by the cam N until the loose thread is needed, which, as above stated, is when the looper passes forward and around the farther needle. The tube 40 is shown in Figs. 5 and 10 and partially in section in Fig. 9. It passes at one end through the opening in the side at the rear of the cylindrical casing and is arranged on an incline to bring its upper end in proximity to the notch 2. Near its upper end it rests on the screw 43, secured on the casing. This tube is formed throughout its body of any suitable material, preferably of metal, with a smooth interior surface, but at either end the shell is cut away slightly in the interior and a hardened-metal piece 44 set in with a flaring head adapted when in position to be flush with the exterior of the tube. The interior diameter of this set-in piece 44 is also the same as the interior diameter of the tube 40, making the interior of the entire tube in a single plane, the object being to prevent any lint that comes off from the thread in passing through the tube from being formed into a ball. The thread ordinarily used on these machines for covering the seam is cop-yarn—that is, not twisted hard, and necessarily when passing through the eyelets and the tube throws off a great quantity of lint, and should the end pieces of the tube be of less diameter than the tube proper a ball would be formed near the inside mouth of the end piece, thus rendering the thread liable to break. The mouth of this set-in piece is rounded off, so as to minimize the friction on the thread, that there may be no danger, no matter how poor the quality of thread used, of breaking the same. This piece 44, which is set in at the end of the tube, may be screw-threaded or otherwise secured in position.

Since the take-up mechanism is supported on the main shaft outside one of the journal-bearings thereof and adjacent thereto, under ordinary circumstances there would be danger of the oil used to lubricate the bearing getting on the looper-thread and soiling the same. To prevent this, we provide the rotating cam-disk, having the cam-surfaces 29 and 34, with a hub 45, which fits against the journal of the main shaft, there being interposed a piece of felt or other substance to stop the oil as far as possible. As a further safeguard we provide the hub 45 with an annular groove 46 between the interposed packing of felt and the place which the guide occupies, so that any oil that may not be stopped by the felt packing may catch in the groove 46 and not come into contact with the thread.

The feeding mechanism shown herein and described is the same as that shown, described, and claimed in the application filed by us on the 12th day of July, 1894, Serial No. 517,338, but is herewith claimed also in combination with those parts with which it has especial connection as aiding to make a complete and operative machine.

Upon the main shaft is an eccentric O, around which is attached the strap 47, having the oil-reservoir 48 and downwardly-projecting connecting-rod 49 pivoted between prongs of the fork on the end of the bar P. This bar P forms a portion of the feeding mechanism of the machine, its rear end being within the standard and secured to the connecting-rod 49, as shown, while the major portion lies outside the standard and within the cylindrical bed-plate of the machine. This bar P is grooved or, rather, cut out on its upper and under surfaces to give the requisite stiffness and strength, the groove or cut-out portion on the upper surface forming a trough 50, in which the looper-shaft rocks and reciprocates, this trough enabling the parts to be more compactly arranged within the cylindrical casing or bed-plate. This bar P is pivoted at a point forward of its center on the rod or pin 51, passed through the lower portion of the bed-plate, whereby in the rotation of the main shaft the bar is oscillated up and down. At the forward end of the bar P there is passed through the same a pin 52, to which the lower ends of two links 53 are secured, while said links at their upper ends are secured to a second pin 54, passing through the bar p, grooved at its forward end, and having secured to it the feed-dog q by means of the screw 55. The rear end of the feed-dog-carrying bar has a head 56, slotted to fit and slide on the flat pin 57, pivoted between the vertical arms 58 of the crank or yoke 59, pivoted on the rod or pin 60, passing through the lower part of the bed-plate at the rear thereof. This yoke has a rearwardly-extending arm 61, passing into the standard A and forked on its inner end. Between the prongs of the fork is pivoted the end of the connecting-rod 62, having on its upper end the strap 63, embracing the eccentric O' on the main shaft.

The looper-shaft passes between the slotted head 56 and pin 60 and between the vertical arms 58, but the rear end of the bar-arm P is dropped below the pin 60, this bar being of the form shown in side elevation in Fig. 6.

One of the vertical arms of the yoke or crank 59 has a vertical projection with a curved slot 64, through which passes a bolt 65, upon which is slipped the end of the arm 66, the bolt and the end of the arm 66 being adjustable up and down in the slot 64 by the nut 67, the bolt acting as a pivot for arm 66, so that by raising and lowering the pivot in its relation to the pivot-point of the rocking yoke the throw of the arm 66 is varied, and as this arm 66 is at its forward end secured to the feed-log-carrying bar p by the pivot-bolt 68 the rocking of the yoke or crank 59 moves the feed-dog-carrying bar forward or back the length of throw, and thus the length of the stitch being varied at will by the means above described.

We shall now proceed to describe the looper mechanism and the connections between it and the main shaft for operating said looper mechanism, and we refer to Figs. 1, 3, 7, 8, 13 to 17, inclusive, and 23.

On the main shaft B of the machine adjacent to the eccentric O and between said eccentric and the eccentric O' is the eccentric O², having the downwardly-extending connection-rod 69, its upper part formed with a strap 70, embracing the eccentric. It is necessary for the rod 69 to have an oscillating motion on the ball-eccentric O² on an axis passing centrally through the eccentric and transverse to the shaft because of the ball connection hereinafter described of the rod 69 with the looper-shaft. In order to allow for this movement, but to prevent motion on the opposite axis, which would cause wobbling of the rod 69, we provide the ball-eccentric O² with an annular groove 71 around its entire periphery, and through each part of the strap 70 there passes a screw or pin 72 into the grooves. These pins are on opposite sides of the collar and serve as pivot-points on which the rod 69 may swing or oscillate in the rotation of the shaft and eccentric. To afford better wearing-surfaces we preferably put shoes on the pins 72 to travel in the groove. By this arrangement in the rotation of the shaft the strap or collar oscillates on an axis transverse to the main shaft, but movement on a vertical axis is prevented.

In Figs. 17ᵃ, 17ᵇ, and 17ᶜ there is shown another means for transmitting movement from the main shaft to the vibrating looper-shaft whereby the eccentric strap or collar oscillates on an axis transverse to the main shaft, but whereby movement on a vertical axis is prevented. In this form of connection the groove on the ball-eccentric O² is dispensed with and the periphery of said eccentric simply made convex, while the strap 70 of the construction heretofore referred to is concave on its inner face to embrace the periphery of the ball-eccentric. This strap 70 has a downwardly-extending rod 69, but is also provided with a rearwardly-extending lug 106, to which is secured a stud 107, carrying a ball 108, this stud 107 being screwed into the lug 106 and the ball secured in any suitable manner on said stud. On the rock-shaft F, alongside the crank S, is arranged a second crank 109 between the two collars 110 and 111, said crank 109 being sleeved on the shaft F and having an upwardly-extending arm 112, formed with a sleeve on its upper end, through which passes a bolt or stud 113. One end of a link 114 embraces this stud, being held in position by the nut 115 on the bolt or stud 113, while the other end of said link is formed with a rounded socket and embraces the ball 108 on the stud 107. This construction (shown in Figs. 17ᵃ, 17ᵇ, and 17ᶜ) is an alternative form of that shown in Figs. 13, 14, 15, 16, and 17, but for certain reasons we prefer to use the construction last described.

The lower end of the connecting-rod 69 is formed with a socket adapted to receive a ball 73 on the end of the stud 74, which passes through the opening 75 in the lug 76, projecting from the crank connection R, and said stud is secured in position by a nut 77.

The crank connection R (shown in detail in Fig. 23) is formed with a split sleeve r at its inner end, and within this split sleeve the end of a looper-shaft Q is rigidly clamped by the screws 78.

Upon the main shaft is another eccentric O³, for giving the forward and backward movement to the looper-shaft through the connections now about to be described. This eccentric is embraced by a strap or collar 79, which has a rearwardly-extending connecting-rod 80, having on its outer end a sleeve 81, secured to the shaft or pin 82, which has bearings in the upper end of the arms 83 of the crank S, fixed on the rock-shaft F. An arm 84 projects downwardly from the crank S and has a sleeve or collar 85 embracing a pin 86 fixed therein. Upon either end of the pin 86 is pivoted one end of links 87, which extend inwardly and at their inner ends are pivoted on the pin 88, passing through and secured to the eyebolt s, which passes through the opening 89, formed in the lug 90 on the inner end of the crank connection R, being secured thereto by the nut 91.

It will be noticed that on the main shaft are arranged in series all the eccentrics for giving motions to the various parts—namely, first, the eccentric O' for giving the forward and backward movement to the feed-dog-carrying bar, then that for operating the needle-arm, then O³ for giving forward and backward movement to the looper-shaft, then O² for oscillating said looper-shaft, and finally O for raising and lowering the feed-bar P.

The looper-shaft Q projects in a single plane from the sleeve r through the entire length of the casing, having one bearing in the journal 92, where it passes out of the standard A, and its other bearing in the opening l in the front of the casing. It rests throughout a portion of its length in the trough 50, formed in the rocking bar P. At its outer end it is provided with a head T, formed, as shown, with a cut-away portion U, which allows of the passage of the needles. Near the outer end is an opening for the passage of the shank of the looper M, this being held in position by the end screw u. Secured to the looper-shank is the looper guard-finger t.

Figs. 13, 14, 15, and 16 show side views of the various positions taken by the looper and its oscillatory mechanism during the formation of the stitches.

In Fig. 18 are shown two pieces of fabric V, whose edges have been superposed and a line of straight stitches v passed down through the same back of the edge.

Fig. 19 is a plan view showing the same fabric as in Fig. 18 after the pieces have been spread out so as to lie in the same plane, the dotted lines of said figure representing the turned-down raw edges.

Fig. 20 shows the appearance of the upper surface of the fabric after the raw edges have been covered on the machine, (herein shown,) w w representing the continuous rows of loops passed down through the fabric by the needles c d.

Fig. 21 is a bottom plan of the same, showing the loops in the thread w and the under or looper thread x passed back and forth between the rows of loops in thread w and binding down the raw edges y of the fabric, as shown in section in Fig. 22.

Various minor modifications and changes in the construction of the various parts of this machine may be devised without in any way departing from the spirit of the invention.

Having thus described our invention, what we claim, and desire to secure by Letters Patent, is—

1. A sewing-machine comprising a casing or bed-plate, feeding mechanism moving in a defined path longitudinally of the said bed-plate or casing, a looper-support within said casing, a thread-carrying looper on said looper-support, arranged with its longitudinal axis at an angle to the line of feed and means for giving said looper movements as follows, a forward-and-backward movement in the direction of its length and sidewise movements bodily in a right line across the line traversed by it in its other movements, substantially as described.

2. A sewing-machine comprising a main shaft, a second shaft, a thread-carrying looper secured on said second shaft, and connections between the main shaft and said second shaft for positively oscillating the looper in the direction of its length and transversely of its supporting-shaft; and for positively reciprocating said looper bodily laterally in line with the longitudinal axis of the second shaft, the connections for securing the positive movements being independent of each other; substantially as described.

3. A sewing-machine comprising a driving-shaft, a pivoted transverse frame as R oscillated thereby, a looper-carrier on said frame, a looper on said carrier arranged with its longitudinal axis transverse to the axis of the carrier, an inclosing casing for the looper and its carrier, and devices for actuating said looper, and a feeding device working longitudinally of said casing, substantially as described.

4. A sewing-machine comprising a driving-shaft, a looper-carrying frame and looper thereon, said carrying-frame having a vibratory movement on its axis in the direction of the length of the looper and a bodily movement transverse to the longitudinal axis of the looper and mechanism for vibrating said looper-carrying frame on its axis and for giving it its transverse movement, said mechanism including a device operated from the driving-shaft, and positively applied to the looper-carrying frame, substantially in the line of the axis on which it vibrates to give the longitudinal movement to the looper, an inclosing casing for the looper-carrying frame and a feeding device working longitudinally thereof and parallel with the axis of the looper-carrying frame, substantially as described.

5. A sewing-machine comprising a main shaft, a second shaft, a thread-carrying looper secured on said second shaft, with eccentric and universal-joint connections between the looper-carrying shaft and the main shaft for positively reciprocating the looper laterally bodily to avoid the needles and for positively oscillating it in the direction of its length to catch the needle-loops, the connections for securing the positive movements being independent of each other; substantially as described.

6. A sewing-machine having suitable stitch-forming mechanism and a cylindrical casing, said stitch-forming mechanism comprising a transverse main shaft, a looper within said cylindrical casing, a mechanism for operating said looper, comprising a shaft extending lengthwise of and within the casing to one end of which the looper is operatively connected, a ball eccentric connection between the main shaft and the looper-shaft for oscillating the latter and an independent connection between the main shaft and looper-shaft for reciprocating the latter; substantially as described.

7. A sewing-machine comprising a rear standard, the main transverse shaft passing through the standard, the take-up mechanism carried on the outer end of said shaft outside of said standard, the supplemental casing inclosing said take-up mechanism, the bed-plate or casing, the feeding and looper mechanisms extending within the bed-plate or casing, and connections between the main shaft and the feeding and looper mechanisms whereby the latter are operated; substantially as described.

8. In a sewing-machine, the main shaft, the feeding and looper mechanisms arranged at right angles thereto, a casing or bed-plate within which said feeding and looper mechanisms are contained, said looper mechanism including a thread-carrying device having limited movement in the direction of its length and transversely of the casing, a take-up mechanism on the main shaft for taking up the slack in the thread, a stop device for preventing the feed of fresh thread during the operation of the take-up and a pull-off device to pull from the supply a limited quantity of thread; substantially as described.

9. In combination with the standard, a main shaft supported thereby, a bed-plate supported by said standard, and an independent supplemental casing secured to the standard, and into which the main shaft projects, the thread-controlling mechanism arranged on the main shaft within said supplemental casing, and comprising a rotary take-up device, an intermittent stop device and a pull-off; substantially as described.

10. A sewing-machine comprising a main frame and a cylindrical casing forming the bed-plate and supported by said main frame, a supplemental casing in which the thread enters and a tube extending between the supplemental casing and the cylindrical casing for guiding the thread from the one to the other; substantially as described.

11. A sewing-machine comprising stitch-forming mechanism, the standard, the main shaft supported thereby, the supplemental casing secured to the standard and into which the main shaft projects, a bed-plate, a take-up mechanism on the main shaft, a guiding-tube extending between the supplemental casing and the bed-plate for conducting the thread from the take-up into said bed-plate and a guiding-lug attached to the end of the casing adjacent to the looper of the stitch-forming mechanism; substantially as described.

12. A sewing-machine comprising a suitable standard and a bed-plate or casing, a supplemental casing attached to the standard, a take-up located within said supplemental casing, a cover therefor, and means for holding said cover in an open or closed position; substantially as described.

13. A sewing-machine comprising a casing or bed-plate, a reciprocating needle, a feed device having a defined path of reciprocation, a thread-carrying looper having a limited movement in the casing or bed-plate and transversely to the line of feed, and a thread-controlling mechanism for said under thread comprising a rotating double cam take-up and a pull-off; substantially as described.

14. A sewing-machine comprising a bed-plate or casing and a feeding mechanism working longitudinally thereof, a main shaft, a plurality of vertically-reciprocating thread-carrying eye-pointed needles, a single under-thread-carrying looper having a limited reciprocating movement transversely of the feed and coöperating with the needles to form stitches and a thread-controlling device for said under thread comprising a double cam take-up on the main shaft and a pull-off also arranged on said shaft; substantially as described.

15. A sewing-machine comprising a main shaft, a rotary take-up, a sleeve or hub arranged on the main shaft adjacent its bearing and provided with an annular groove between the take-up and said bearing; substantially as described.

16. A sewing-machine comprising a main shaft, a feeding mechanism comprising a pivoted bar trough-shaped on its upper surface, a looper-shaft resting in said trough, and a feed-dog-carrying bar connected to the pivoted bar, said pivoted bar, looper-shaft and feed-dog-carrying bar being arranged in practically the same vertical plane but in different horizontal planes, and operatively connected at their rear ends with the main shaft; substantially as described.

17. In a sewing-machine, the hollow standard, the main shaft therein, the eccentrics on said shaft, the cylindrical bed-plate outside the standard, but supported thereby, the pivoted bar arranged in the bed-plate and having a downwardly-dropped rear part extending into the standard and connected with one of the eccentrics, the looper-shaft arranged within the bed-plate, but extending at its rear end into the standard and connected to an eccentric on the main shaft, a feed-dog-carrying bar arranged within the bed-plate and connected at one end with the pivoted bar, a rocking crank-frame to which the feed-dog-carrying bar is connected at its inner end, said rocking crank-frame having a rearward extension connected with an eccentric on the main shaft; substantially as described.

18. A sewing-machine comprising a cylindrical casing, a vertically-oscillating bar pivoted to said casing and having at its outer end two upwardly-extending links, a feed-dog-carrying bar pivoted to said links, connections between the rear end of said pivoted bar and the feed-dog-carrying bar and the main shaft respectively, and a looper-shaft arranged above the pivot-bar and below the feed-dog-carrying bar and passing between the vertical links, whereby the parts may be packed within a small space; substantially as described.

19. A sewing-machine comprising a cylindrical casing and feeding mechanism including a rocking crank having upwardly-extending arms 58, a feed-dog-carrying bar connected at one end with said upwardly-extending arms, with suitable means for raising and lowering said feed-dog-carrying bar, and a looper-shaft arranged in a plane below the feed-dog-carrying bar and passing between the vertical arms 58, and connections between said rocking crank and the main shaft and the looper-shaft and the main shaft; all substantially as described.

20. A sewing-machine comprising a driving-shaft, a ball eccentric thereon, a strap or collar embracing the same, a looper-shaft, a universal-joint connection between the strap or collar and the looper-shaft, a rocking crank, and a universal-joint connection between said rocking crank and the strap or collar, and operative connections between the rocking crank and the looper-shaft; substantially as described.

21. A sewing-machine comprising a driving-shaft, a ball eccentric thereon, a strap or collar embracing the same, a looper-shaft, a universal-joint connection between the strap or collar and the looper-shaft, a rocking crank, a link secured thereto, a universal-joint connection between the link and the strap or collar and operative connections between the rocking crank and the looper-shaft; substantially as described.

22. A sewing-machine comprising a driving-shaft, a ball eccentric thereon, a strap or collar embracing the same, a looper-shaft, a ball-and-crank connection between the strap or collar and the looper-shaft, a rocking crank, a link secured at one end to said crank, a lug on said strap or collar, and a ball-joint connection between the opposite end of said link and said lug and operative connections between the rocking crank and the looper-shaft; substantially as described.

23. A sewing-machine comprising a driving-shaft, a looper-shaft at right angles thereto, a rocking crank journaled on an axis parallel with the main shaft and having an upwardly-extended arm provided with a stud, and an eccentric and universal-joint connection between the main shaft and the looper-shaft, and between the main shaft and said crank and operative connections between the rocking crank and the looper-shaft; substantially as described.

24. A sewing-machine comprising a driving-shaft, a looper-shaft at right angles thereto, a rock-shaft parallel with the main shaft, a crank sleeved on said rock-shaft and having an upwardly-extended arm provided with a stud and an eccentric and universal-joint connection between the main shaft and the looper-shaft and between the main shaft and said crank, and means connecting the rock-shaft with the looper-shaft; substantially as described.

25. A sewing-machine comprising the main shaft, a looper-shaft, a looper secured thereto, a rock-shaft parallel with the main shaft, a crank on the rock-shaft, connections between the crank and the main shaft, and between the crank and the looper-shaft for reciprocating the latter backward and forward to enable the looper to avoid the needles, and the additional connections between the main shaft and the looper-shaft whereby the latter is oscillated; substantially as described.

26. In combination with the main shaft, the looper-shaft, and intermediate operative connections between the main shaft and looper-shaft for oscillating the latter, said connections including an eccentric on the main shaft, a downwardly-projecting connecting-rod having a socket on its lower end, a crank as R having a lug with an opening for the reception of a stud, said stud having a ball fitting the socket in the end of the connecting-rod, said crank having a split sleeve within which the end of the looper-shaft is clamped; substantially as described.

27. In combination with the main shaft, a rock-shaft parallel therewith, a crank on said rock-shaft operated by the main shaft, a looper-supporting shaft having a sliding and oscillating movement and a pivotal connection between the crank and the looper-shaft for reciprocating the latter and means for rocking the looper-shaft; substantially as described.

28. In combination with the main shaft, the rocking crank oscillated thereby, the links pivoted to the lower end of said crank, a looper-shaft, an eyebolt connected thereto, said links being pivoted to the eyebolt, whereby a forward-and-backward reciprocation may be given the looper-shaft, and means for rocking the looper-shaft; substantially as described.

29. In combination with the main shaft and looper-shaft, the rocking crank, the crank R to which the looper-shaft is secured, said crank having a lug 90, an eyebolt secured to said lug, and links pivoted at one end to the eyebolt and at the other end to the rocking crank, and means for rocking the looper-shaft; substantially as described.

30. In combination with the main shaft and looper-shaft, intermediate operative connections between the two for reciprocating the latter comprising a connection-rod as 80, a rock-shaft having a crank secured thereon, to one end of which the rod 80 is pivoted, links pivoted to the lower end of said crank, an eyebolt to which the other ends of the links are pivoted, and a crank as R, to one end of which the eyebolt is secured, and to the other end of which the looper-shaft is secured, and means for rocking the looper-shaft; substantially as described.

31. In combination with the main shaft and looper-shaft, the crank R having the split sleeve r, within which the end of the looper-shaft is clamped, the lug 76, and lug or bearing 90, with operative connections between the lug 76 and the main shaft for oscillating the crank R, and connections between the lug or bearing 90 and the main shaft for reciprocating said crank; substantially as described.

32. A sewing-machine comprising a main shaft, a looper-shaft arranged with its axis at right angles to the axis of the main shaft, said main shaft being provided with an eccentric and a downwardly-projecting connecting-rod, a crank having a sleeve at one end in which the looper-shaft is clamped, and a ball-and-stud connection between said crank and the connecting-rod; substantially as described.

33. A sewing-machine comprising a main shaft, a looper-shaft arranged with its axis at right angles to the axis of the main shaft, said main shaft being provided with an eccentric and a downwardly-projecting connecting-rod, a crank to which the looper-shaft is clamped, a ball-joint connection between said crank and the connecting-rod, a rock-shaft as F, a crank fixed thereon, with connections between the same and the main shaft, and an additional pivotal connection between said crank and the crank to which the looper-shaft is secured, all substantially as described.

34. A sewing-machine comprising a main shaft, a cylindrical casing forming the bed-plate of the machine, a single shaft extending lengthwise of and within the casing, its axis being at right angles to the axis of the main shaft and having bearings in said casing, a looper secured to said shaft within the casing, and independent positive connections between said shaft and the main shaft whereby the former is both oscillated and reciprocated, the oscillating movement being the loop-taking movement in the direction of the length of the looper, and the reciprocating movement being the lateral bodily movement to avoid the needles; substantially as described.

35. A sewing-machine comprising a main shaft, a cylindrical casing forming the bed-plate of the machine arranged transversely to the main shaft, a feeding mechanism having movement in the direction of the length of said cylindrical casing, a shaft arranged lengthwise of and within the casing having a longitudinal movement lengthwise of said casing, with connections between said shaft and the main shaft for imparting to said looper-shaft said movement, a looper secured to said shaft and arranged with its longitudinal axis transverse to the axis of its supporting-shaft, with means for oscillating said looper-shaft, whereby the looper has movement back and forth across the line of feed, as well as sidewise parallel with the movement of the feed; substantially as described.

36. A sewing-machine comprising stitch-forming mechanism including a vertically-reciprocating needle, a looper-shaft having on its outer end a head, a looper secured on the said head, and a cut-out portion in said head adjacent the looper and between the same and the end of the shaft to allow of proper clearance for the needles; substantially as described.

37. A sewing-machine comprising a rear standard, a main shaft supported therein, a bed-plate attached to the rear standard, a shaft supported in said bed-plate and carrying a looper but extending into the rear standard, said looper being supported on said shaft with its longitudinal axis at right angles to the axis of the shaft, and independent sets of universal-joint connections located within the rear standard and connecting the main shaft with the rear of said looper-shaft, whereby said looper-shaft by said connections respectively, is reciprocated longitudinally of the bed-plate to give said looper its needle-avoiding movement, and oscillated on its longitudinal axis to give said looper its loop-taking movement; substantially as described.

38. A sewing-machine comprising a main shaft, a looper-shaft, a looper secured thereon with its longitudinal axis at right angles to the axis of the shaft, connections between the main shaft and the looper-shaft for oscillating the latter to enable the looper to take the needle-loops, and connections between the main shaft and the looper-shaft for reciprocating the latter to give the looper its needle-avoiding movement, said connections including a rocking crank and a universal-joint connection between said rocking crank and the looper-shaft; substantially as described.

39. A sewing-machine comprising a main shaft, a looper-shaft, a crank to which the latter is secured at its rear end, connections between said crank and the main shaft for oscillating the looper-shaft, and connections between said main shaft and the looper-shaft for reciprocating the latter, including a rocking crank driven from the main shaft, and a link and pivotal eyebolt connection between said rocking crank and the crank to which the looper-shaft is attached; substantially as described.

40. A sewing-machine comprising a main shaft, a single shaft provided with a thread-carrying looper on one end, a double crank-frame to which the looper-shaft is attached, and intermediate means between said crank and the main shaft comprising two independent sets of connections whereby reciprocatory and oscillatory motions are given the looper-shaft, the former being a needle-avoiding movement and the latter a loop-taking movement; substantially as described.

41. A sewing-machine comprising a shaft, a looper secured thereto, said looper-shaft extending continuously throughout the bed-plate of the machine and supported in bearings therein, a main shaft, an eccentric and universal-joint connection intermediate the main shaft and the rear end of the looper-shaft for giving oscillatory movement to said looper-shaft, and an eccentric connection between the main shaft and the rear of the looper-shaft for giving reciprocatory movement thereto, both said sets of connections being in rear of the bed-plate of the machine; substantially as described.

42. In a sewing-machine, the hollow standard, the main shaft supported thereby, the cylindrical bed-plate attached thereto, the rod 51 within the same, the bar P pivoted thereto having a depressed rear end extending into the standard and formed with a trough-shaped upper surface 50, the feed-dog-carrying bar hinged at one end to the bar P and at its rear end secured to the rocking crank 59, the rod 60 to which said crank is secured, said rod being supported in the cylindrical bed-plate said crank 59 having a rearward extension passing into the standard, a shaft Q having bearings in each end of the cylindrical casing and fitting in the trough 50, and lying between the bar P and the feed-dog-carrying bar and extending into the standard, with connections between the main shaft and the feeding and looper mechanisms; substantially as described.

43. A sewing-machine having a cylindrical casing forming the bed-plate, provided with a rear vertical plate having a slot therein, a removable top plate for the casing provided with a spring-bolt adapted to fit the slot in the said rear plate of the casing; substantially as described.

44. In a sewing-machine the combination with stitch-forming mechanism for making two continuous rows of parallel stitching of a work-plate having in front of the stitch-forming mechanism two vertically-projecting ribs forming between them a groove or guide of width sufficient to receive the downwardly-projecting edges of the fabric to be sewed, and a presser-foot having a keel arranged in a plane between the sides of said groove and adapted to bear in the groove formed by the line of division of the fabric and press the latter in the guide-groove between the ribs; substantially as described.

45. A sewing-machine comprising mechanism for making parallel rows of stitches, a throat-plate provided with needle-openings, a tongue extending rearwardly of said openings, and also having vertically-projecting ribs in advance of said openings, forming between them a guide or groove for the edges of the fabric, and a presser-foot having a keel arranged in a plane to enter said guide or groove and press the fabric therein, substantially as described.

46. A sewing-machine comprising a plurality of vertically-reciprocating needles, a throat-plate and a presser-foot, one of said elements being provided with vertically-projecting ribs forming between them a groove or guide of width sufficient to receive the raw edges of two pieces of fabric and the other of said elements having a keel or fin adapted to bear in the groove formed by the line of division of the fabrics and press the latter in the guide-groove between the ribs, said throat-plate being provided with a suitable tongue in rear of the fin and guiding-slot, and complemental stitch-forming mechanism including a device for laying a thread across the raw edges of the fabric; substantially as described.

47. A sewing-machine comprising a rear standard, a supplemental casing secured thereto having a hinged cover, a cylindrical casing secured to the rear standard, and having a removable top plate and a removable end cap; substantially as described.

48. A sewing-machine comprising a cylindrical casing formed with a practically solid front wall, said wall being provided with openings 15, 16, a cap provided with pins adapted to fit said openings, whereby side movement of the cap is prevented, and a spring attached at one end to the casing and adapted to engage the cap, whereby said cap is secured in position on the cylinder; substantially as described.

49. A sewing-machine comprising a rear hollow standard within which certain of the operating parts are supported, and having a rear opening for access to said parts, a door adapted to cover said opening, a pivotal screw upon which said door is hinged and a spring-washer between the head of the screw and the surface of the door, with means for holding the door at its free end whereby rattling of the same is prevented; substantially as described.

50. A looper mechanism for sewing-machines, consisting of an actuating-shaft and a looper-carrying shaft, arranged at a right angle to each other, and two independent sets of connections between the actuating-shaft and one end of the looper-shaft for imparting to the latter positive rocking movements and positive right-line movements, respectively, one set of these movements being in a direction transverse to the other, substantially as described.

51. In a sewing-machine a main shaft, a looper-shaft at right angles thereto, a cylindrical casing in which the looper-shaft extends, feeding mechanism extending within and reciprocating longitudinally of the casing, a looper operatively connected to the looper-shaft, and means for operating said looper-shaft whereby the looper will be given a loop-taking movement transversely of the feed movement and a needle-avoiding movement longitudinally of the casing; substantially as described.

52. In a sewing-machine the combination with the main shaft, a looper-supporting shaft, a casing inclosing said looper-supporting shaft, a thread-carrying needle, a feeding device having movement in the direction of the length of said casing and in a plane parallel with the longitudinal axis of the looper-supporting shaft a thread-carrying looper on said looper-supporting shaft, arranged with its longitudinal axis at an angle to the line of feed, and means for giving said looper four movements, namely, a positive loop-taking and loop-leaving movement at an angle to the line of feed and two positive needle-avoiding movements, two of said movements being in the arc of a circle and the other two being bodily movements in a right line across the line traversed by the looper in its first-mentioned movements; substantially as described.

In testimony whereof we affix our signatures in presence of two witnesses.

LORENZ MUTHER.
RUSSEL G. WOODWARD.
ELIAS CALVIN HOLLAND.

Witnesses:
W. S. NORTH,
CHESTER MCNEIL.